United States Patent [19]
Roulinson

[11] Patent Number: 5,141,291
[45] Date of Patent: Aug. 25, 1992

[54] VEHICLE WHEEL AND WHEEL COVER RETENTION MEANS

[75] Inventor: Daniel A. Roulinson, Wyandotte, Mich.

[73] Assignee: Ford Motor Company, Dearborn, Mich.

[21] Appl. No.: 535,639

[22] Filed: Jun. 11, 1990

[51] Int. Cl.⁵ .............................................. B60B 7/12
[52] U.S. Cl. ........................ 301/37 CD; 301/37 PB; 301/37 C
[58] Field of Search ............. 301/37 P, 37 C, 37 CD, 301/37 TP, 37 PB, 37 B, 37 T

[56] References Cited

U.S. PATENT DOCUMENTS

| | | | |
|---|---|---|---|
| 2,386,241 | 10/1945 | Lyon | 301/37 C |
| 3,348,885 | 10/1967 | Dully et al. | 301/37 CD |
| 3,876,257 | 4/1975 | Buerger | 301/37 C |
| 3,891,276 | 6/1975 | Spisak | 301/37 T X |
| 3,894,775 | 7/1975 | Christoph et al. | 301/37 |
| 4,004,837 | 1/1977 | Main | 301/37 |
| 4,012,078 | 3/1977 | Meyers | 301/37 |
| 4,133,583 | 1/1979 | Spisak | 301/37 |
| 4,363,520 | 12/1982 | Connell | 301/37 P |
| 4,382,635 | 5/1983 | Brown et al. | 301/37 |
| 4,470,638 | 9/1984 | Bartylla | 301/37 |
| 4,572,584 | 2/1986 | Brown | 301/37 |
| 4,626,037 | 12/1986 | Kushner | 301/37 |
| 4,790,605 | 12/1988 | Stalter et al. | 301/37 CM |

FOREIGN PATENT DOCUMENTS

| | | | |
|---|---|---|---|
| 0501213 | 4/1954 | Canada | 301/37 C |
| 2027601 | 12/1971 | Fed. Rep. of Germany | 301/37 B |
| 1213998 | 4/1960 | France | 301/37 CD |

*Primary Examiner*—Russell D. Stormer
*Attorney, Agent, or Firm*—Daniel M. Stock; Roger L. May

[57] ABSTRACT

A vehicle wheel which includes a spider, a rim, and a retention means, wherein said retention forms an outwardly opening channel which clampingly and releasably secures a wheel cover to the vehicle wheel. The retention means may consist of an annular C-shaped ring which contains on its radially outer surface spring fingers which bitingly engage in a press-fit manner the radially inner surface of the rim or is otherwise permanently affixed to the vehicle wheel. The wheel cover has an axially laterally inwardly extending flange with a beaded end that is releasably secured with the channel.

1 Claim, 3 Drawing Sheets

VEHICLE WHEEL AND WHEEL COVER RETENTION MEANS

BACKGROUND OF THE INVENTION

This invention relates in general to vehicle wheels and more specifically to means for retaining wheel covers to vehicle wheels.

DESCRIPTION OF THE RELATED ART

Numerous methods and systems of releasably securing wheel covers to vehicle wheels are known to those skilled in the art. One common method relies upon metal spring fingers which are located circumferentially about the periphery of the wheel cover. The wheel cover is pressed concentrically and laterally axially inwardly towards the vehicle wheel causing the spring fingers to bitingly engage in a press-fit manner a radially inner surface of the rim of the vehicle wheel. To remove the wheel cover, an axially outward force is applied to the wheel cover to overcome the axial restraint created by the rim upon the spring fingers. An example of this method of attachment can be seen in Tatar, U.S. Pat. No. 4,826,252.

The use of metal spring fingers has several disadvantages. Spring fingers that bitingly engage along the inner radial surface of the rim generally require that wheel covers be of multi-piece construction. Also, with repeated attachment and detachment of the wheel cover, the spring fingers may fatigue and break. Additionally, the rim is subject to acquiring numerous scratches which detracts from the appearance of the rim and may also lead to rim oxidation.

A similar method of attachment involves using radially outwardly extending arcuate ridges, located on axially laterally inwardly extending flanges of the wheel cover, to engage in a press-fit manner an annular circumferential groove located on an inner radial surface of the rim. The forces necessary to create the press-fit condition are generally provided by a wire ring supporting the arcuate ridges and from the inherent flexural strength of the flange. Again, the wheel cover is releasably securable by applying axial forces to the wheel cover. Wheel cover designs utilizing wire rings to provide radial support necessarily must be of multi-piece construction which is more expensive and geometrically complex than unitary molded wheel covers. Schobbe, U.S. Pat. No. 4,529,251 and Pfeiffer et al., U.S. Pat. No. 4,671,575 are examples of wheel covers using the wire ring support system.

Another way known to releasably secure a wheel cover to a vehicle wheel is to engage an axially inwardly extending flange of the wheel cover into a cooperating aperture located on the spider of the wheel. The axially inward end of the flange has a flexurally deformable end portion to releasably secure the flange within the aperture of the spider. Applying axial forces to the wheel cover will cause the wheel cover to engage and disengage the vehicle wheel. Christoph et al., U.S. Pat. No. 3,894,775 is illustrative of this means of retention. This design is disadvantaged by the requirements that the spider of the wheel necessarily must contain apertures. Also, the attachment means relies on the flexural strength of the wheel cover material. Therefore, the wheel cover material should have high strength and low creep characteristics over sub-zero to high temperatures and yet remain flexible enough to adapt to deformations of the vehicle wheel under severe loading conditions. Such materials are relatively expensive, and their enhanced mechanical properties are not needed for the major part of the wheel cover structure.

SUMMARY OF THE INVENTION

The present invention provides for releasably securing a wheel cover to a vehicle wheel by providing a vehicle wheel with a laterally axially outwardly opening channel which clampingly and releasably secures a laterally axially inwardly protruding flange of the wheel cover. This invention thus allows for the use of a unitary molded wheel cover which relies primarily on the compressive and not flexural strength of the wheel cover material for retention. Thus a wheel cover may be made of an easily molded unitary design consisting of a relatively low strength, high creep, inexpensive material resulting in a low cost of manufacture. Hence, the present invention avoids the disadvantages associated with multi-piece construction or the expense accompanying high-strength, low creep material required in other designs.

BRIEF DESCRIPTION OF THE DRAWINGS

Other advantages will become apparent to those skilled in the automotive wheel trim arts upon reading the following description with reference to the accompanying drawings in which:

FIG. 5 is a circumferential section of the annular ring showing pairs of circumferentially located spring fingers.

DESCRIPTION OF THE PREFERRED EMBODIMENT

Figure 1:
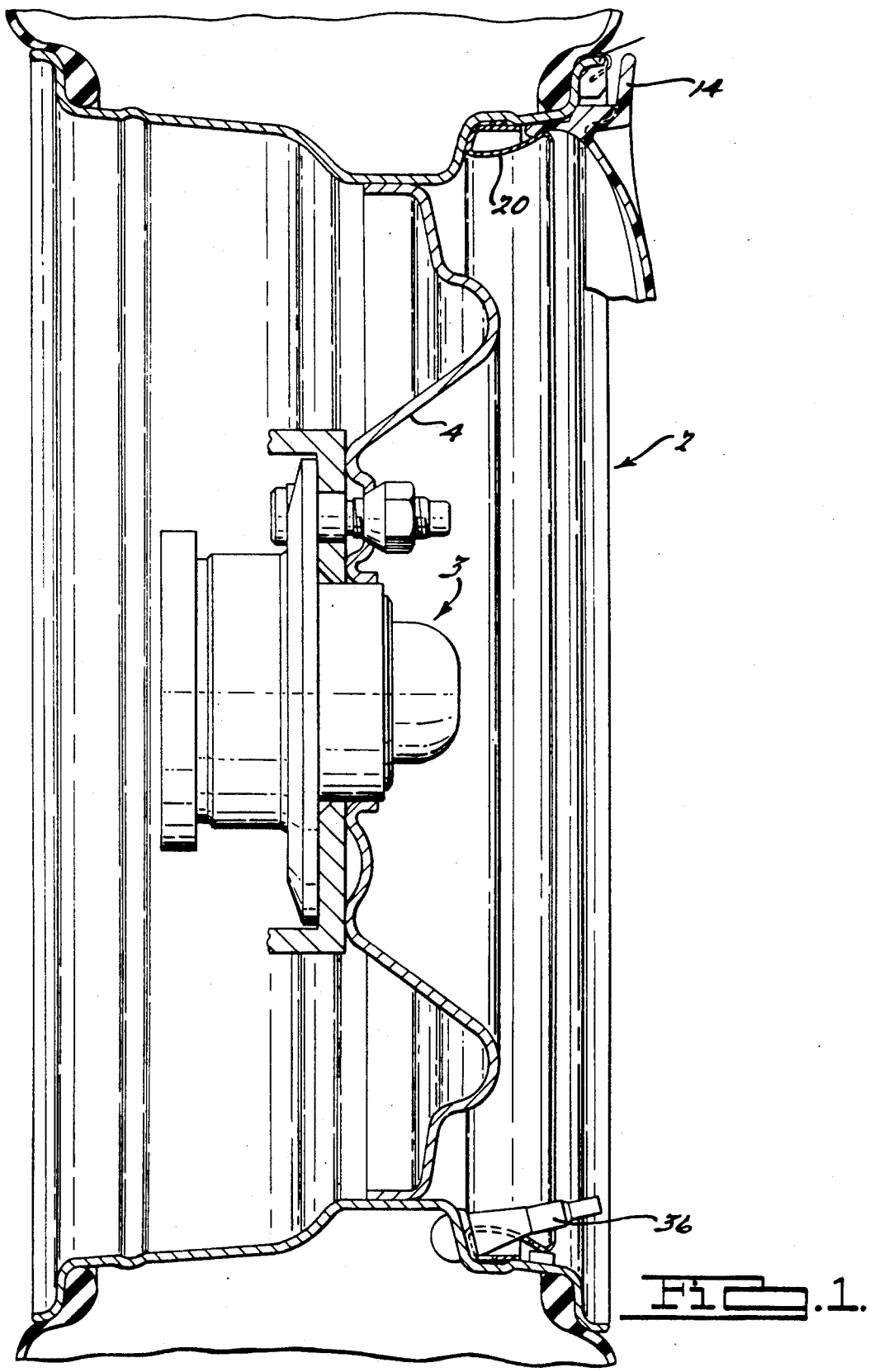
FIG. 1 is a cross-sectional view of a vehicle wheel, annular ring and a portion of a wheel cover wherein the wheel cover is releasably secured as previously described.
Figure 2:
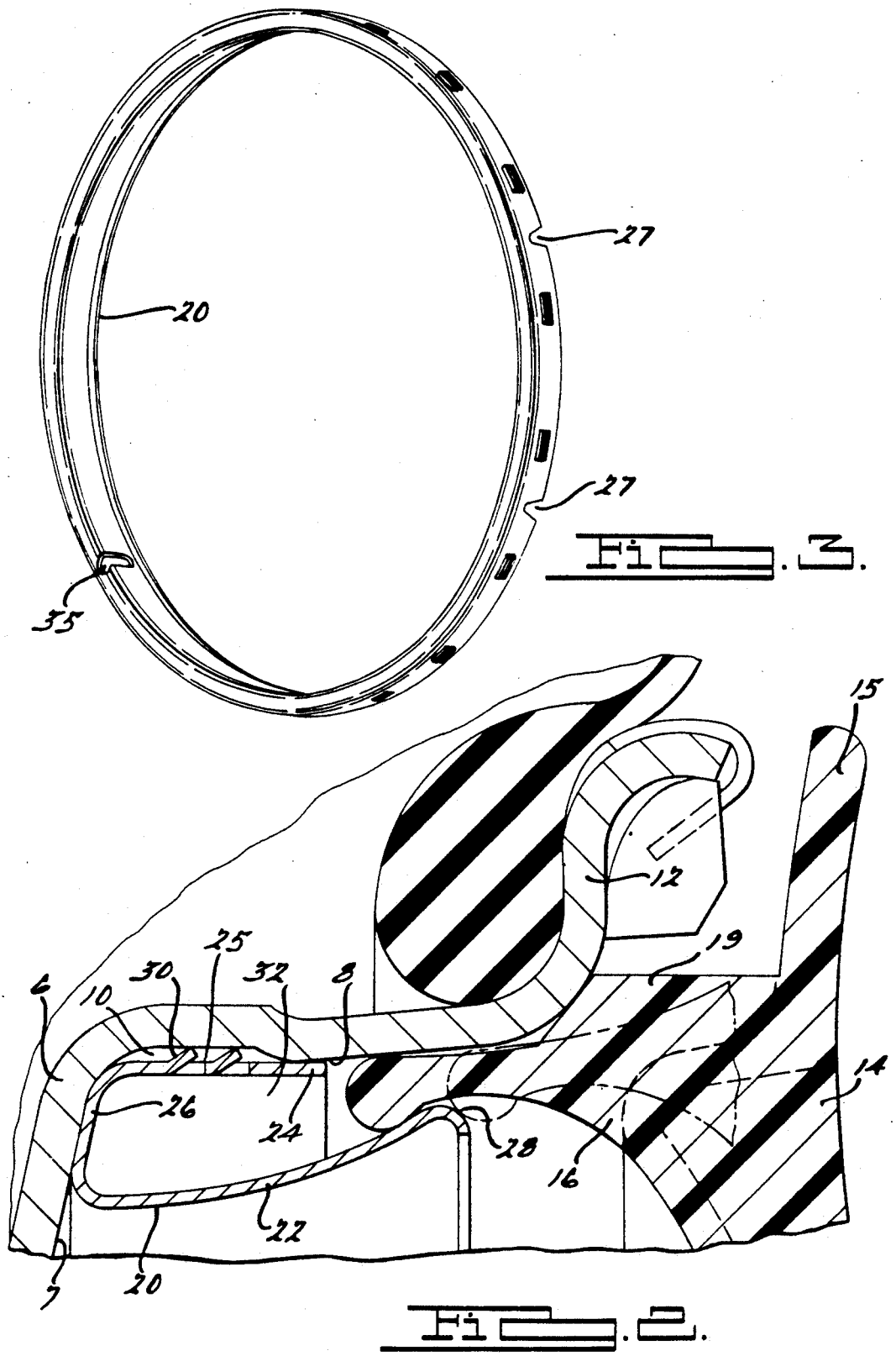
FIG. 2 is a sectional view taken along line 2—2 of FIG. 1 depicting the insertion/removal of the wheel cover relative to the annular ring and vehicle wheel.

Referring first to FIG. 1, a vehicle wheel 2 is provided for mounting on a vehicle axle indicated generally at 3 which consists generally of a spider 4 and a rim 6. As may best be seen in FIG. 2, the rim 6 has a radially extending circumferential laterally axially inner flange 7, an inner radial surface 8, a radially outward extending circumferential groove 10, and a radially extending circumferential laterally axially outer flange 12.

The wheel cover 14 contains an essentially radially planar disk 15, a radially inner circumferential axially laterally inwardly extending flange 16 with an enlarged beaded end 18, and radially outer, circumferential axially inwardly extending standoff flange 19.

Figure 3:
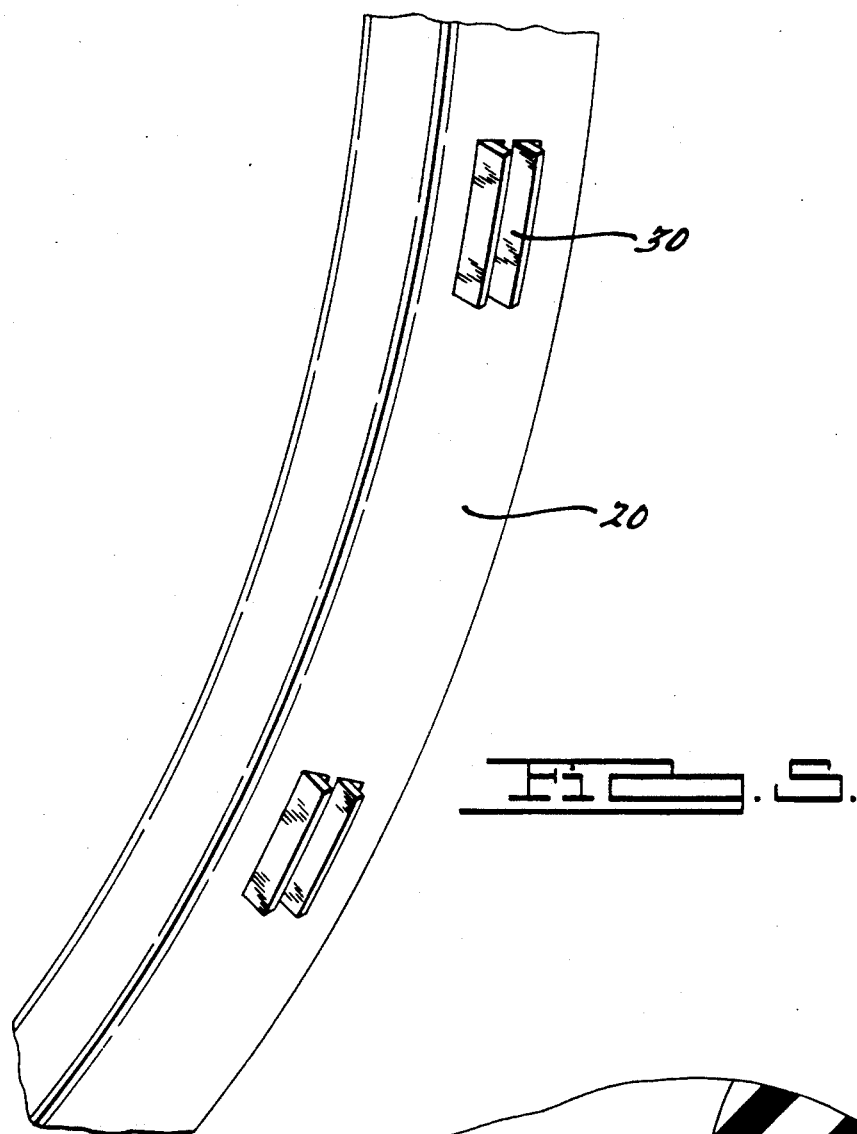
FIG. 3 is a perspective view of the annular ring including circumferentially spaced spring fingers.

Annular retaining ring 20 is generally C-shaped in cross-section and consists of a radially inner, axially outwardly extending portion 22 and a radially outer, axially extending portion 24 which is connected by radially extending intermediate portion 26. Radially inner portion 22 terminates with a radially inwardly curving cam surface 28. Located on a radially outer surface 25 of radially outer portion 24 of annular ring 20 are circumferentially located pairs of axially spaced spring fingers 30 which extend axially and radially outwardly. These spring fingers 30 are formed by striking the fingers from annular ring 20, as seen in FIG. 5. Axially outwardly opening channel 32 is formed by radially inner portion 22, intermediate portion 26, radially outer portion 24, and the radially inner surface 8 of rim 6. Radially inner portion 22 may have along its axially outer end circumferentially located intermittent axially extending gaps 27 (as shown in FIG. 3) to accomodate circumferential flexure of portion 22. Aperture 35 is provided to accomodate the valve stem 36.

In order to releasably secure wheel cover 14 to vehicle wheel 2, it is first necessary to fixedly secure annular retaining ring 20 to vehicle wheel 2. An axially inwardly concentric force applied to annular retaining ring 20 will cause the annular retaining ring 20 to traverse axially inwardly until intermediate portion 26 abuts flange 7. At this time the spring fingers 30 will have traversed axially across inner radial surface 8 and sprung into groove 10. The spring fingers 30 and outer radial portion 24 should cooperate in press-fit manner with groove 10 and inner radial surface 8 of rim 6, respectively, to fixedly secure the annular retaining ring 20 to rim 6 of vehicle wheel 2. An axially outward force placed upon annular retaining ring 20 will cause spring fingers 30 to bitingly engage the groove 10.

In order to releasably secure the wheel cover 14, an axially inward concentric force is applied to axially outward face of disk 15 causing the beaded end 18 to contact the cam surface 28 and the inner radial surface 8. As further force is applied, cam surface 28 will be deflected radially inwardly and then radially outwardly as the beaded end 18 passes into channel 32, thus clampingly and releasably securing the beaded end 18, and accordingly, wheel cover 14. Cam surface 28 deflects radially inwardly with relative ease due to circumferentially intermittent axial gaps 27 contained within portion 22. Beaded end 18 is restrained by a radially inner force from the inner surface 8 of rim 6 and a radially outward and axially inward force exerted by cam surface 28. The axially inward translation of wheel cover 14 stops when the axially inner end of standoff flange 19 abuts flange 12 of rim 6.

The wheel cover 14 may be removed from the vehicle wheel 2 by applying axially outward forces to the periphery of disk 15 of wheel cover 14 causing beaded end 18 to withdraw from channel 32.

Figure 4:
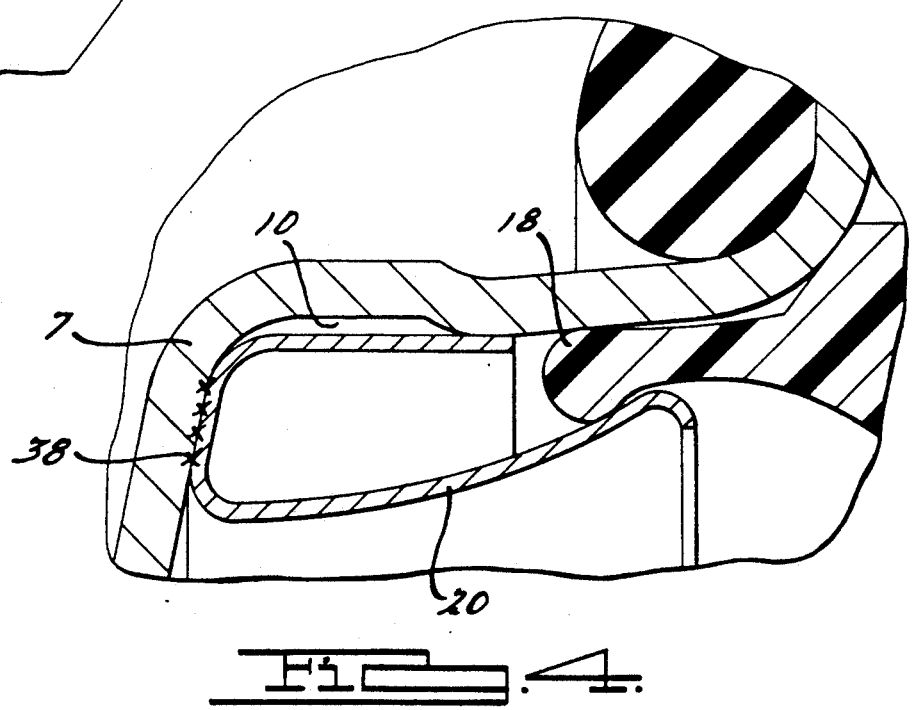
FIG. 4 is sectional view similar to FIG. 2 wherein the annular ring is permanently affixed to the spider of the vehicle wheel.

A second embodiment is seen in FIG. 4 wherein an annular retaining ring 20 is directly affixed to flange 7. Affixation means 38 may include, but is not limited to, spot welding or bonding of portion 26 to flange 7. The axially outwardly opening channel 32 functions in the same manner as previously discussed to releasably secure beaded end 18 of wheel cover 14.

I claim:

1. A vehicle wheel assembly comprising a wheel having a spider and a rim, and a wheel cover having a laterally axially inwardly protruding flange having a beaded end, and retention means, said retention means comprising an axially, laterally outwardly opening circumferentially extending channel, wherein said channel has radially inner and radially outer portions and at least one portion is resiliently movable in a substantially radial direction;

wherein the radially inner portion of the channel is formed as a part of a generally C-shaped annular retaining ring which permanently affixes to the vehicle wheel;

wherein the annular retaining ring includes a plurality of spring fingers which bitingly engage a circumferentially extending groove located on the radially inner surface of the rim; and wherein the radially inner portion of the channel clampingly and releasably urges the laterally axially inwardly extending flange of the wheel cover radially outwardly and only compressively against another radial surface of the rim, the other radial surface extending axially substantially parallel with the flange and the channel inner portion and engaging the flange at a position spaced laterally outwardly from the flange beaded end to effect lateral retention of the wheel cover with respect to the wheel.

* * * * *